INVENTOR.
ALGIE A. REECE

United States Patent Office 3,515,220
Patented June 2, 1970

3,515,220
LAWN ROLLER
Algie A. Reece, Rte. 3, Waynesville, N.C. 28786
Filed Nov. 1, 1967, Ser. No. 679,844
Int. Cl. A01b 29/06
U.S. Cl. 172—245
2 Claims

ABSTRACT OF THE DISCLOSURE

A gardening machine that is readily convertible from a tiller to a lawn roller, and which includes the replacement of the blades from a rotor tiller with a pair of pulling rollers and a separate front roller assembly.

---

This invention relates generally to agricultural machinery.

A principal object of the present invention is to provide a means for converting a rotor tiller to a lawn roller.

Another object of the present invention is to provide a convertible rotor tiller wherein the blades are replaceable by means of a pair of pulling rollers.

Yet another object of the present invention is to provide a rotor tiller wherein a front roller assembly is attachable thereto.

Still another object is to provide a convertible rotor tiller and lawn roller to which a seat may be secured so that the operator may ride thereupon during operative use.

Other objects of the present invention are to provide a convertible rotor tiller and lawn roller which is simple in design, inexpensive to manufacture, rugged in construction, easy to use and efficient in operation.

Figure 1:
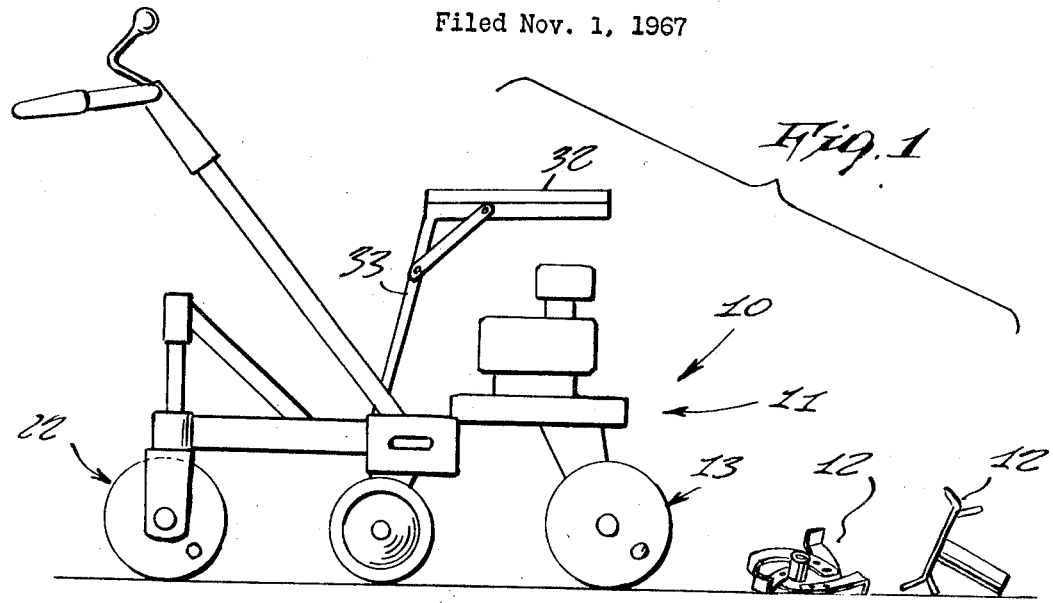
Figure 2:
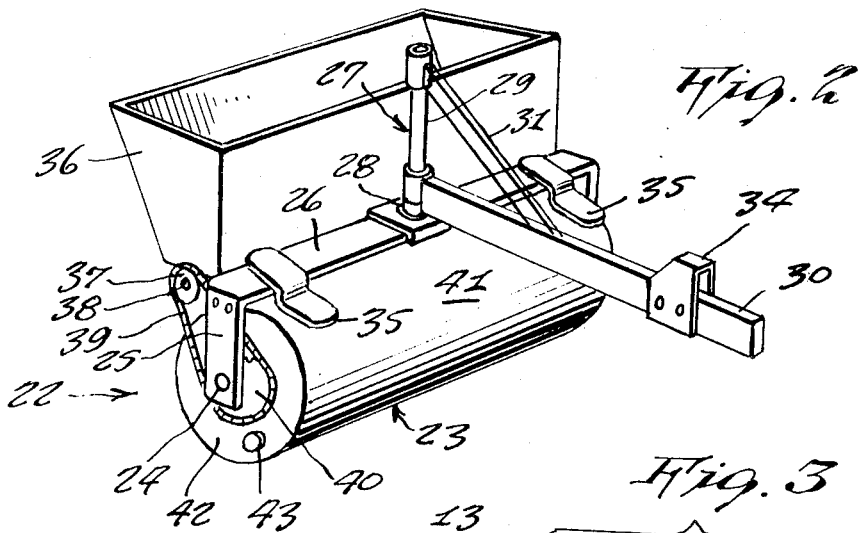
Figure 3:
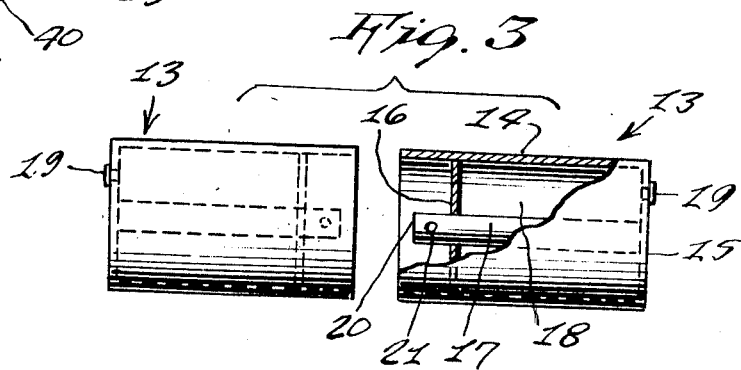

These and other objects will be readily evident upon a study of the following specification and the accompanying drawing wherein:

FIG. 1 is a side elevation view of the present invention showing the rotor tiller converted into a lawn roller, FIG. 2 is a perspective view of the front roller assembly, and FIG. 3 is a side elevation view shown partly in cross-section and illustrating the pair of pulling rollers.

Referring now to the drawing in detail, the reference numeral 10 represents a lawn roller, according to the present invention, which is formed from a rotor tiller 11 from which the tiller blades 12 have been removed.

As is shown in FIG. 1 of the drawing, the rotor tiller blades 12 are replaced by means of a pair of pulling rollers 13 that are secured upon the tiller shaft that normally supports the blades 12. Each of the pulling rollers is of cylindrical configuration and comprises a cylindrical side wall 14 bounded by opposite end walls 15 and 16. As is shown in FIG. 3 of the drawing, the end wall 16 is recessed within the roller so as to allow an end of a shaft 17 to protrude thereto and yet remain within the limits of the length of the roller. The end walls and the side walls are formed watertight so as to provide a water-tight chamber 18 therewithin for purpose of receiving water for weight purposes. A plug 19 secured in the end wall is removable to provide an access opening for placement of water therewithin. The shaft 17 is rigidly secured concentrically within the roller and has a portion 20 that protrudes outwardly of the chamber 18 through the end wall 16, the protruding portion 20 being provided with a key opening 21 for purpose of securement to the tiller shafts.

The front roller assembly 22 comprises a singular, elongated roller 23 rotatable about a shaft 24 that is mounted within parallel opposite legs 25 of a U-shaped bracket 26. A frame 27 is mounted pivotally free upon an upstanding post 29 affixed centrally on the bracket 26, the frame 27 being supported upon a thrust bearing 28, and the frame including an upstanding bearing sleeve at a front end of a horizontal flat bar 30 which is rigidly secured together and further strengthened by means of a diagonally extending brace 31. A seat 32 carried upon a frame 33 may be secured to a seat bracket 34 mounted upon the flat bar 30. It is to be noted that the bracket 26 may be formed from channel iron so as to give strength thereto. A pair of foot pads 35 are secured near the opposite ends thereof upon which a person or rider may place his feet while riding upon the device.

As is shown in FIG. 2 of the drawing, the front roller assembly 22 may be used for securement thereto of various attachments such as a bin 36 having a rotatable auger in the lower end thereof that is rotatably driven by means of a sprocket 37 mounted upon the auger shaft 38, the sprocket being driven by a chain 39 that is passed also around a sprocket 40 secured upon the shaft 24 of the roller 23. Thus the attachment may be used for seeding or fertilizing purposes or the like.

The roller 23 comprises a cylindrical side wall 41 bounded between end walls 42 one of which is provided with a plug 43 to seal an opening through which water may be placed within the roller.

The lawn mower 10 is powered by a carried gasoline engine, shown at the right on FIG. 1, and controlled by conventional controls shown on the diagonal handle at the left in FIG. 1. Conventional transmission, not shown, interconnects the engine output shaft to a tiller shaft secured to tiller rollers 13.

In use, the lawn mower is intended to travel from right to left as viewed in FIG. 1, the device being steered by placement of the operator's feet upon pads 35 so to manually pivot the assembly 22 at will about the post 29 supported in the sleeve of the frame 27.

In operative use the rotor tiller blade 12 are removed from the tiller shaft and replaced by the pulling rollers 13. The front roller assembly is secured to the rotor tiller, together with the seat frame and seat. The operator may now ride upon the device while using it as a lawn roller.

While various changes may be made in the detailed construction, it is understood that such changes will be within the spirit and scope of the present invention as is defined by the appended claims.

I claim:

1. In a lawn roller, the combination of a rotor tiller said rotor tiller having conventional blade members removed therefrom, said rotor tiller having secured thereto in substitution of said blade members a pair of pulling rollers, a pivotable front roller assembly secured to said roller tiller, said tiller rollers and front roller providing a means for converting the rotor tiller to lawn rolling purposes, said pulling rollers comprising a pair of rollers removably secured to a tiller shaft of said rotor tiller, each of said pulling rollers comprising a cylindrical member having a cylindrical side wall and a pair of circular end walls secured watertight thereto and forming a water tight compartment therewithin, one of said end walls being recessed inwardly in said cylindrical side wall forming a space around an end of a concentric shaft mounted within said roller and protruding through said recessed end wall, said shaft end having a key opening therein, said key opening comprising securement means to said tiller shaft and one of said end walls having an opening for allowing placement of water within said cylinder, said opening being sealed by a removable plug, a front roller assembly comprising an elongated, cylindrical roller, rotatable about a central shaft extending therethrough and secured at its opposite ends within the parallel legs of a Y-shaped bracket, said bracket having an upstanding central post secured thereupon, said upstanding post supporting pivotally free relative thereto a forward end of a frame, said frame including a horizontal extending bar having a vertical sleeve at a forward end and receiving therein said post, a diagonally extending brace between an upper end of said sleeve and said horizontal bar to provide strength in construction, said bar carrying a seat bracket, a seat frame secured thereto, said seat frame having a seat at the upper end thereof upon which an operator may ride, and said U-shaped frame having a pair of foot pads secured near the ends thereof upon which a rider may place his feet and steer.

2. The combination as set forth in claim 1 wherein said front roller assembly provides means for securement thereto of various attachments such as a lawn feeder or seeder comprising a bin having a horizontally extending auger in the lower end thereof, said auger being mounted upon a shaft having a sprocket at one end thereof, said sprocket being driven by a chain passed around a second sprocket mounted upon said shaft of said roller shaft.

References Cited

UNITED STATES PATENTS

| | | | |
|---|---|---|---|
| 2,133,173 | 10/1938 | Meyer | 94—50 |
| 2,664,683 | 1/1954 | De Cato | 94—50 |
| 2,878,731 | 3/1959 | Kressin | 94—50 |
| 2,906,438 | 9/1959 | Carpenter | 94—50 X |
| 3,282,353 | 11/1966 | Troyer et al. | 172—43 |
| 3,303,762 | 2/1967 | Jennings | 94—50 |
| 3,416,419 | 12/1968 | Kronholm | 94—50 |

FOREIGN PATENTS 590,892  4/1959  Italy.

ROBERT E. BAGWILL, Primary Examiner

A. E. KOPECKI, Assistant Examiner

U.S. Cl. X.R.

172—123, 272